(12) United States Patent
Reed et al.

(10) Patent No.: US 6,578,909 B1
(45) Date of Patent: Jun. 17, 2003

(54) VEHICLE ROOF STRUCTURE

(75) Inventors: John T Reed, Royal Oak, MI (US); Matt Edward Maser, Frankfort, IL (US); Paul Elia, West Bloomfield, MI (US); Peter Ellis Hackett, Belleville, MI (US)

(73) Assignee: Ford Global Technologies, L.L.C., Dearborn, MI (US)

( * ) Notice: Subject to any disclaimer, the term of this patent is extended or adjusted under 35 U.S.C. 154(b) by 0 days.

(21) Appl. No.: 10/064,789

(22) Filed: Aug. 16, 2002

(51) Int. Cl.[7] ............................................. B62D 25/06
(52) U.S. Cl. ................... 296/210; 296/29; 296/203.01; 296/205
(58) Field of Search ........................ 296/210, 29, 30, 296/203.03, 203.02, 209, 205, 203.01, 193

(56) References Cited

U.S. PATENT DOCUMENTS

| | | | | |
|---|---|---|---|---|
| 4,618,163 A | * | 10/1986 | Hasler et al. | ............... 280/785 |
| 4,775,181 A | | 10/1988 | Shoda | |
| 4,883,310 A | | 11/1989 | Miyazaki et al. | |
| 5,018,781 A | | 5/1991 | Kumasaka et al. | |
| 5,226,696 A | | 7/1993 | Klages et al. | |
| 5,269,585 A | * | 12/1993 | Klages et al. | ............... 296/205 |
| 5,318,338 A | | 6/1994 | Ikeda | |
| 5,458,393 A | | 10/1995 | Benedyk | |
| 5,795,014 A | * | 8/1998 | Balgaard | ..................... 296/210 |
| 6,126,232 A | * | 10/2000 | Nakano | ..................... 296/210 |

FOREIGN PATENT DOCUMENTS

| | | | | |
|---|---|---|---|---|
| JP | 59-167376 A | * | 9/1984 | ................. 296/210 |
| JP | 3-136979 A | * | 6/1991 | ............. 296/203.03 |
| JP | 3-208777 A | * | 9/1991 | ................. 296/205 |
| JP | 4-78773 A | * | 3/1992 | ............. 296/203.02 |
| JP | 4-208677 A | * | 7/1992 | ................. 296/205 |
| JP | 6-127433 A | * | 5/1994 | ................. 296/210 |

* cited by examiner

Primary Examiner—D. Glenn Dayoan
Assistant Examiner—Patricia Engle
(74) Attorney, Agent, or Firm—Gigette M. Bejin

(57) ABSTRACT

A vehicle roof structure including a front header, a pillar support member, a side roof rail, and a roof rail outer front member. The front header has a substantially box-shaped cross-section. The pillar support member has an elongated member extending between a windshield opening and a door opening, a short first member at one end of the elongated member extending along the windshield opening, and a short second member at the end extending along the door opening. The first member includes a first edge adjoining an end of the front header. The side roof rail has a substantially box-shaped cross-section and adjoins a second edge of the pillar support second member. The roof rail outer front member is affixed to the pillar support member. The roof rail outer front member adjoins the end of the front header in a region of the first edge, adjoins the side roof rail in a region of the second edge, and extends along at least a portion of the elongated member of the pillar support member. The roof rail outer front member and the pillar support member form a substantially box-shaped cross-section extending between the first, second and elongated members such that a continuous substantially box-shaped cross-section exists throughout the joint defined by the vehicle roof structure.

19 Claims, 6 Drawing Sheets

VEHICLE ROOF STRUCTURE

BACKGROUND OF INVENTION

The present invention relates generally to a vehicle body assembly and, more particularly, concerns a roof structure for a vehicle body.

Unitized vehicle body assemblies have been used for many years to provide motor vehicle design flexibility, ease of manufacturing, and satisfactory structural behavior.

With regard to the upper body structure of a vehicle body such as where the vehicle front header, roof side rail, and front A-pillar connect, it has been conventional to provide some sort of reinforcement structure. It is desirable that the roof front header panel and the roof side rails are rigidly connected with the A-pillar so as to form a rigid roof structure for the vehicle. In a typical vehicle roof structure, the cross-sectional profile of the front header, roof said rail and front A-pillar are all different. This normally occurs due to design considerations, particularly with respect to the roof ditch in the vicinity of the upper door frame and roof side rail. When the cross-sectional profiles differ among the roof header, roof side rail and A-pillar, it can be difficult to optimize the structural characteristics of the resulting joint because stresses are concentrated during static or dynamic loading in the region of the abrupt change in cross-sectional properties. Thus, there is a need for an improved vehicle roof structure having increased stiffness properties and improved structural characteristics compared to conventional joints connecting the roof header, roof side rail and body A-pillar.

SUMMARY OF INVENTION

The present invention provides an improved roof structure for a modular vehicle body. A vehicle roof structure in accordance with the present invention provides a joint between the roof header, roof side rail and A-pillar having a continuous substantially box-shaped cross-section thereby eliminating dramatic or abrupt changes in cross-sectional properties of the roof joint. The substantially continuous cross-section of the joint provides an efficient load path for applied stresses resulting in an even distribution of the static or dynamic loading event across all members of the joint.

In particular, the present invention provides a vehicle roof structure including a front header, a pillar support member, a side roof rail, and a roof rail outer front member. The front header has a substantially box-shaped cross-section. The pillar support member has an elongated member extending between a windshield opening and a door opening, a short first member at one end of the elongated member extending along the windshield opening, and a short second member at the end extending along the door opening. The first member includes a first edge adjoining an end of the front header. The side roof rail has a substantially box-shaped cross-section and adjoins a second edge of the pillar support second member. The roof rail outer front member is affixed to the pillar support member. The roof rail outer front member adjoins the end of the front header in a region of the first edge, adjoins the side roof rail in a region of the second edge, and extends along at least a portion of the elongated member of the pillar support member. The roof rail outer front member and the pillar support member form a substantially box-shaped cross-section extending between the first, second and elongated members such that a continuous substantially box-shaped cross-section exists throughout the joint defined by the vehicle roof structure.

In another embodiment, a vehicle roof structure is provided that includes a front header, a side roof rail, a pillar support member and a roof rail outer front member. The front header includes an inner front header and an outer front header joined together along a respective windshield flange and a respective roof flange. An end of the inner front header is offset with respect to an end of the outer front header. The front header also has a substantially box-shaped cross-section. The side roof rail includes a roof rail inner rear member and a roof rail outer rear member joined together along a respective door opening flange and a respective roof flange. An end of the roof rail inner rear member is offset with respect to an end of the roof rail outer rear member. The side roof rail also has a substantially box-shaped cross-section. The pillar support member adjoins the end of the inner front header and the end of the roof rail inner rear member. It also includes an elongated member extending between a windshield opening and a door opening. The roof rail outer front member is affixed to the pillar support member, the outer front header and the roof rail outer rear member. The roof rail outer front member extends along at least a portion of the elongated member. The roof rail outer front member and the pillar support member form a substantially box-shaped cross-section that extends between the ends of the inner and outer front headers and the ends of the roof rail inner and outer rear members, and extends along the elongated member such that a continuous substantially box-shaped cross-section exists throughout the joint defined by the vehicle roof structure.

One advantage of the vehicle roof structure according to the present invention is its increased stiffness properties versus conventional joints. This results from the substantially continuous cross-section throughout the joint. In addition, the overall noise vibration and harshness (NVH) performance of the resulting vehicle is improved as well. The resulting safety cage formed by the roof structure can also have improved crash-worthiness.

Other advantages and features of the invention will become apparent to one of skill in the art upon reading the following detailed description with reference to the drawings illustrating features of the invention by way of example.

BRIEF DESCRIPTION OF DRAWINGS

For a more complete understanding of this invention, reference should now be made to the embodiments illustrated in greater detail in the accompanied drawings and described below by way of example of the invention.

In the drawings.

DETAILED DESCRIPTION

While the present invention is described with respect to a method and structure for a front portion of a vehicle roof, the present invention may be adapted and utilized for the rear roof body structure in the same manner described herein.

In the following description, various operating parameters and components are described for one constructed embodiment. These specific parameters and components are included as examples are not meant to be limiting.

Figure 1:
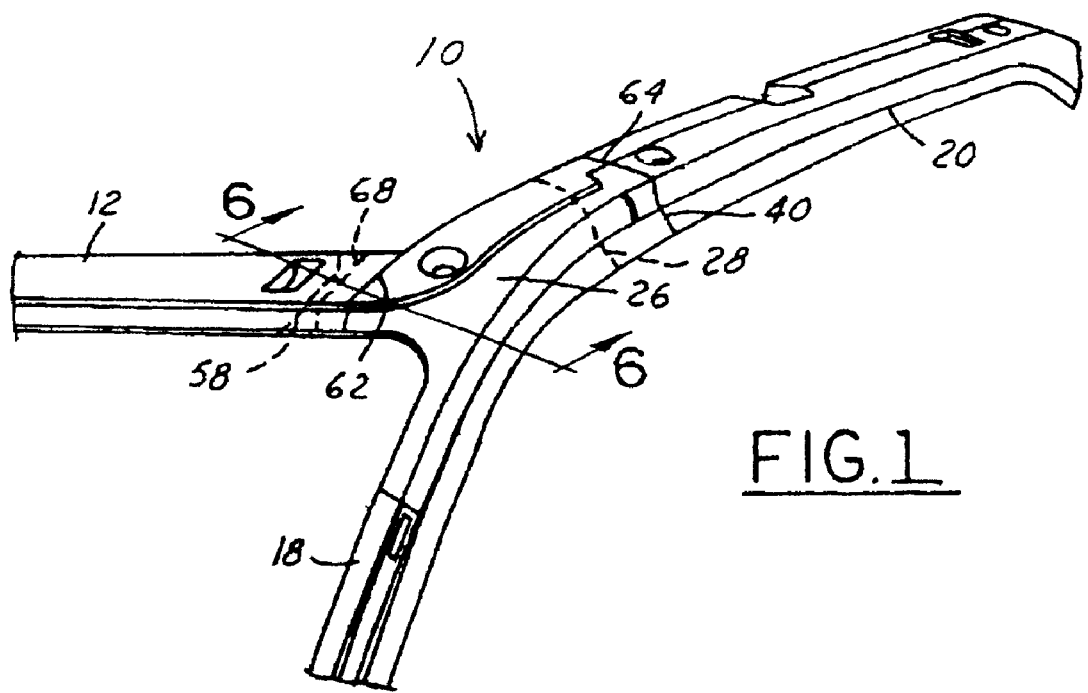
FIG. 1 is a perspective view of a vehicle front roof structure in accordance with an embodiment of the present invention.
Figure 2:
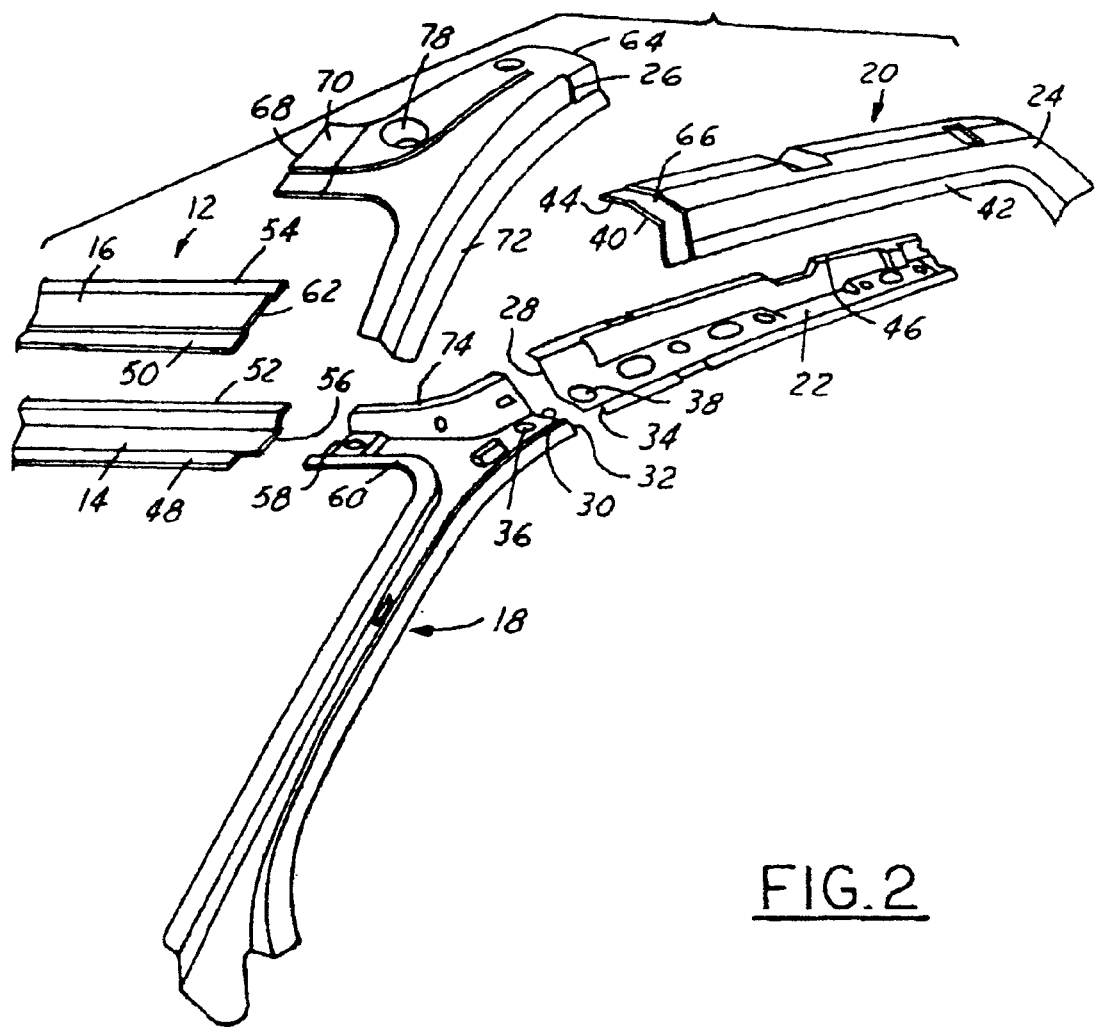
FIG. 2 is an exploded perspective view of the roof structure of FIG. 1.

Referring now to the drawings wherein like reference numerals are used to identify identical components in the various views, FIG. 1 illustrates a perspective view of a vehicle front roof structure in accordance with an embodiment of the present invention. FIG. 2 is an exploded view of the roof structure of FIG. 1 and will be described jointly. The roof structure 10 comprises a front header 12, the A-pillar inner member 18, the side roof rail 20, and the roof rail outer front 26 which acts as the joining member for the other components. The front header 12 includes the front header inner 14 and front header outer 16. Similarly, the side roof rail 20 includes the roof rail inner rear 22 and roof rail outer rear 24.

The parts are configured such that during assembly the end of one part is overlapped with the end of another part, but offset from the joint of the complimentary part. This allows the various parts to be layered or "shingled" during the assembly process and also allows the design to maintain a continuous box-shaped cross-section through all of the parts. It also permits transition between the box-shaped cross-sections without interruption. Thus, as can be seen in FIGS. 1 and 2, the front end 28 of the roof rail inner rear 22 overlaps with the rear end 30 of the A-pillar inner 18 such that the inner flange 32 of the A-pillar inner 18 abuts the door flange 34 of the roof rail inner rear 22 such that the weld access openings 36, 38 substantially align. The front end 40 of the roof rail outer rear 24, however, is offset to the rear from the front end 28 of the roof rail inner rear 22. The roof rail outer rear 24 is fixed to the roof rail inner rear 22 by fasteners, adhesives, welds, or other bonding mechanisms between the door flange 34 of the roof rail inner rear 22 and the door flange 42 of the roof rail outer rear 24 and the roof flange 44 of the roof rail outer rear and the roof flange 46 of the roof rail inner rear 22.

The front header 12 is connected to the A-pillar inner 18 in a similar offset, overlapping manner as the side roof rail 20. Thus, the header 12 is assembled by connecting the front header inner 14 to the front header outer 16 along the windshield flanges 48, 50 and roof flanges 52, 54 by fasteners, adhesives, welding, or other bonding method. The edge 56 of the front header inner 14 overlaps with the windshield edge 58 of the A-pillar inner 18, and the windshield flange 48 overlaps the windshield flange 60 of the A-pillar inner 18. The edge 62 of the front header outer 16, however, is offset toward the door opening from the edge 58 of the A-pillar inner 18.

The roof rail outer front 26 nests over the roof rail outer rear 24, and under the front header outer 16. Thus, the door edge 64 of the roof rail outer front 26 lays over the recessed portion 66 of the roof rail outer rear 24. Similarly, the windshield edge 68 of the roof rail outer front 26 nests beneath the front header outer 16 such that the edge 62 of the front header outer 16 lays on top of the recessed portion 70 of the roof rail outer front 26. Accordingly, the roof rail outer front 26 is fixed to the front header 12 in the region of the recessed portion 70 and fixed to the side roof rail 20 in the region of the recessed portion 66. The roof rail outer front 26 is also fixed to the A-pillar inner 18 along the inner flange 32 and door flange 72.

In the recessed portions 66, 70 where the roof rail outer front 26 meets the side roof rail 20 and front header 16, respectively, there is a three-metal thickness weld. Otherwise, the roof rail outer front 26 and the A-pillar inner 18 are secured together by a two-metal thickness weld along the inner flange 32 of the A-pillar inner 18, the windshield flange 60 and the roof flange 74. The weld access openings such as opening 38 in the roof rail inner rear 22 and opening 36 in the A-pillar inner 18 and opening 78 in the roof rail outer front 26 permit joining of the various parts along the roof ditch 86 by spot welding guns.

The various parts of the vehicle roof assembly just described are preferably constructed of metal such as stamped or rolled steel as is known in the art. One or more of the parts, however, could be constructed of other known vehicle body structure materials such as fiberglass, ceramics, or composite materials such as a carbon-reinforced composite.

Figure 3:
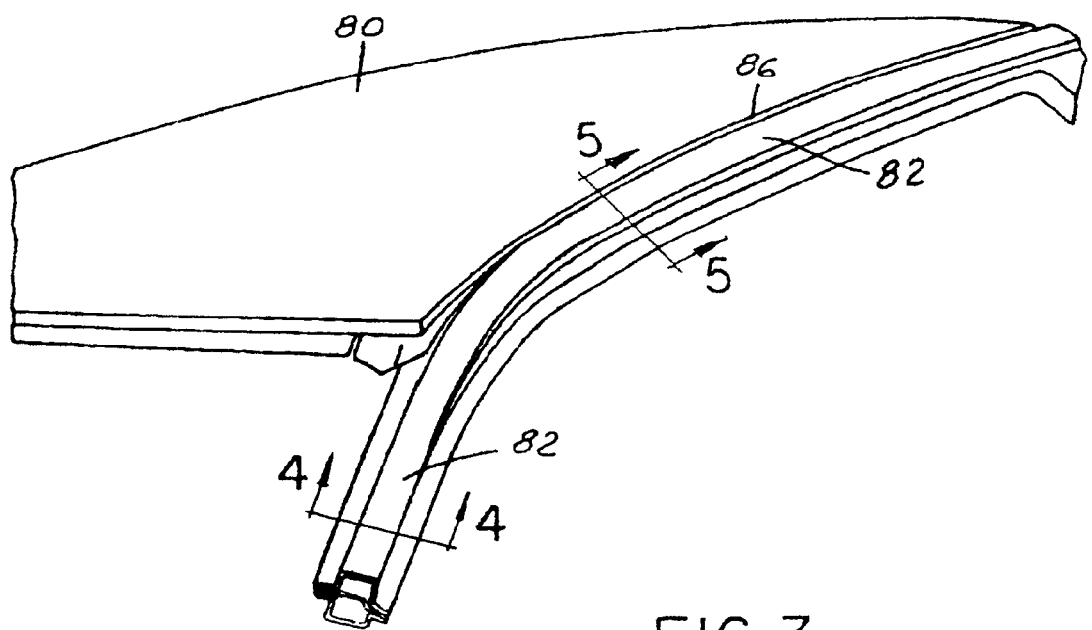
FIG. 3 is a perspective view of the vehicle roof structure of FIG. 1 including the roof and door opening panels.

In the assembled state, the vehicle roof structure 10 provides a solid frame for supporting the exterior roof panel and door opening panels as shown in FIG. 3. The front door opening panel 82 is fixed on top of the A-pillar inner 18 and fixedly attached thereto along the windshield flange 60 and inner flange 32 of the A-pillar inner 18. In a similar manner, the door opening panel 82 is mounted and fixed to the side roof rail 20 along the door flange 42 and roof flange 44 of the roof rail outer rear 24. The roof panel 80 is fixedly attached to the roof structure 10 along the windshield flange 50 of the front header 12 and a roof flange of the door opening panel 82.

Figure 5:
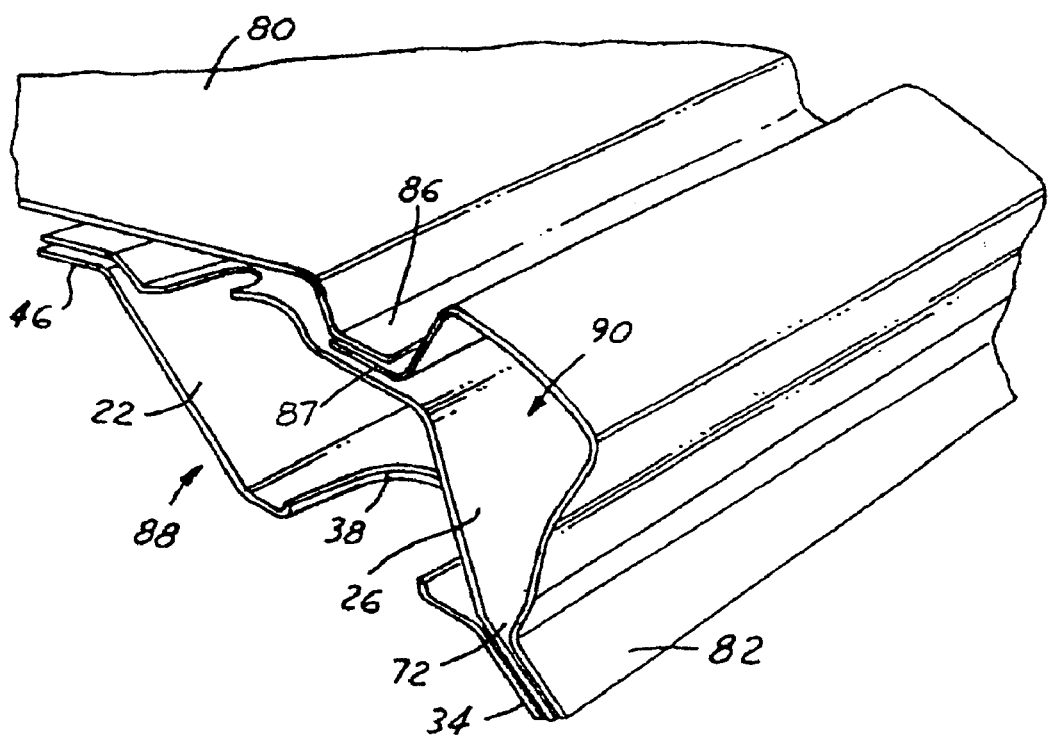
FIG. 5 is a sectional view along line 5—5 of FIG. 3.

One advantage of the roof structure 10 of the present invention is that it permits the roof ditch 86 to have a constant offset with respect to the door opening without compromising the structural integrity of the roof structure 10. This is because of the larger box-shaped cross-section provided by the roof side rail 20. This can best be seen in FIG. 5 which is a sectional view along line 5—5 of FIG. 3. In conventional roof assemblies, the roof ditch 86 is typically in the region of the roof flange 46 of the roof rail inner rear 22 which is significantly offset toward the roof from the seam where the windshield meets the A-pillar. The present roof structure, however, permits the roof ditch 86 to be along the seam defined by the windshield and the A-pillar providing a more aesthetically pleasing appearance. Specifically, the roof panel 80 is attached along the roof flange 87 of the door opening panel 82 to form the roof ditch 86. The integrity of the roof structure is maintained due to the rather large box-shaped cross-section 88 shown in FIG. 5 defined by the roof rail inner rear 22 and roof rail outer rear 24 or roof rail outer front 26. This is significantly larger than, and provides more structural support than, the smaller box-shaped cross-section 90 defined by the door opening panel 82 and roof rail outer rear 24 or roof rail outer front 26.

Figure 4:
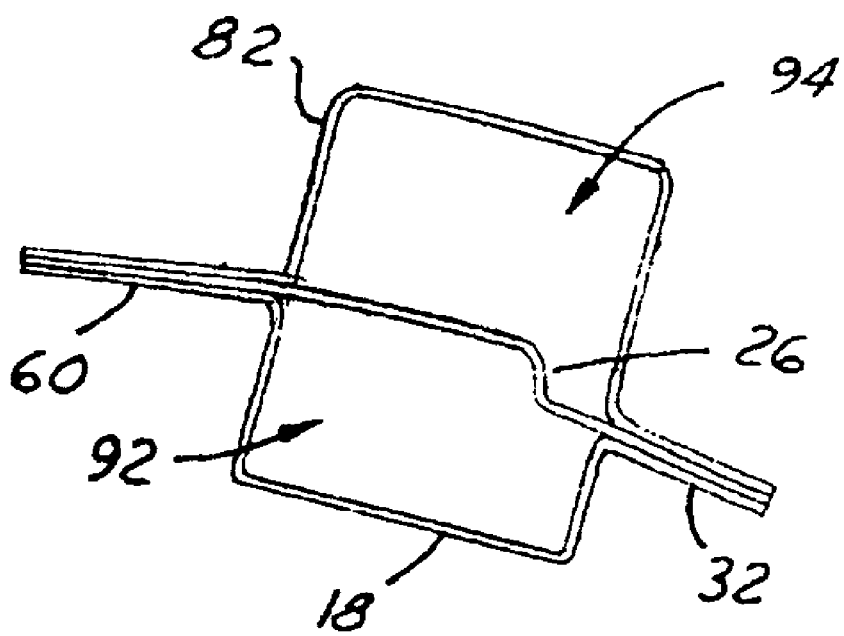
FIG. 4 is a sectional view along line 4—4 of FIG. 3.

Referring now to FIG. 4 there is shown a cross-section along line 4—4 of FIG. 3. As can be seen in FIG. 4, the box-shaped cross-section 92 is maintained between the A-pillar inner 18 and the roof rail outer front 26. An additional box-shaped cross-section 94 is defined between the door opening panel 82 and the roof rail outer front 26. Further down the A-pillar 18, in a direction away from the roof, the roof rail outer front 26 ends and the resulting cross-sectional shape is defined by the door opening panel 82 and the A-pillar inner 18. The A-pillar inner 18, by itself, has a U-shaped or hat-shaped cross-section.

Figure 6:
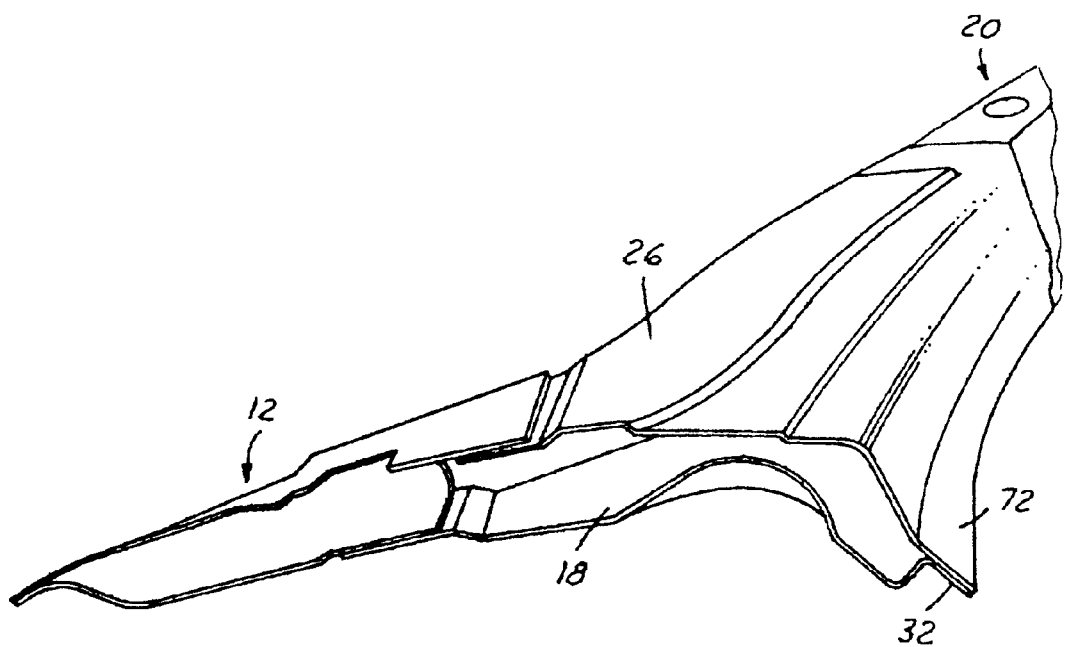
FIG. 6 is a section view along line 6—6 of FIG. 1.

Referring now to FIG. 6 there is shown a sectional view of the roof structure 10 along line 6—6 of FIG. 1. As can be seen in FIG. 6, the substantially box-shaped cross-section is maintained throughout all parts of the roof structure 10. In other words, the box-shaped cross-section defined by the header 12 continues uninterrupted into the box-shaped cross-section defined by the side roof rail 20 which also continues uninterrupted into the box-shaped cross-section defined by the A-pillar inner 18 and roof rail outer front 26. Although the cross-sectional shape of these various cross-sections differ, they are continuous throughout the joint and their profiles change gradually rather than abruptly to prevent areas of stress concentration during static or dynamic loading of the roof structure. The result is a joint having increased stiffness properties as compared to conventional roof structures. The continuous box-shaped cross-section provides an efficient load path for stresses applied to the joint to evenly distribute across the entirety of the roof structure. In all of the transition areas between the various box-shaped cross-sections, the overlapping configurations of the parts creates a series of butt joints that have a backing part to reinforce the joint and maintain the continuous sectional joint thereby reducing stress concentrations at each of the transition joints.

In a preferred assembly sequence for the roof structure 10, the side roof rail 20 is first assembled by joining the roof rail inner rear 22 with the roof rail outer rear 24 as well as the roof rail outer front 26. These three parts then comprise the roof rail subassembly. The roof rail subassembly is then joined to the A-pillar inner 18 along the door flange 32, windshield flange 60 and roof flange 74 of the A-pillar inner 18. This assembly procedure takes place for both the left side of the vehicle and the right side of the vehicle. The door opening panel 82 may also be attached at this time to create each respective body side subassembly. Both body side subassemblies are then welded to the vehicle underbody (not shown) and the front header assembly 12 is laid over the recessed portion 70 of the left and right respective roof rail outer fronts 26 and affixed thereto, thereby tying the two body sides together at the top of the vehicle. The overlapping or nesting configuration of the various parts permits for ease of assembly. Furthermore, the termination points and overlapping of the various parts allows for no more than a three-metal thickness weld along any part of the entire roof structure 10.

From the foregoing, it can be seen that there has been brought to the art a new and improved vehicle roof structure which has advantages over prior vehicle roof structures. While the invention has been described in connection with one ore more embodiments, it should be understood that the invention is not limited to those embodiments. On the contrary, the invention covers all alternatives, modifications and equivalents as may be included within the spirit and scope of the appended claims.

What is claimed is:

1. A vehicle roof structure comprising:
   a front header having a substantially box-shaped cross-section;
   a pillar support member having an elongated member extending between a windshield opening and a door opening, a short first member at one end of said elongated member extending along said windshield opening, and a short second member at a second said end extending along said door opening, said first member having a first edge adjoining an end of the front header;
   a side roof rail having a substantially box-shaped cross-section adjoining a second edge of said pillar support second member; and
   a roof rail outer front member affixed to said pillar support member and adjoining said end of said front header in a region of said first edge, adjoining said side roof rail in a region of said second edge, and extending along at least a portion of said elongated member of said pillar support member, said roof rail outer front member and said pillar support member forming a substantially box-shaped cross-section extending between said first, second and elongated members such that a continuous substantially box-shaped cross-section exists throughout a joint defined by said vehicle roof structure.

2. A vehicle roof structure according to claim 1 wherein said front header comprises an inner front header and an outer front header joined together along a respective windshield flange and a respective roof flange.

3. A vehicle roof structure according to claim 1 wherein said pillar support member is an A-pillar inner support having a substantially hat-shaped cross-section throughout the first, second and elongated members.

4. A vehicle roof structure according to claim 1 wherein side roof rail comprises a roof rail inner rear member and a roof rail outer rear member joined together along a respective door opening flange and a respective roof flange.

5. A vehicle roof structure according to claim 4 further comprising a door opening panel fixedly attached along a respective door flange of said pillar support member, roof rail outer front member, and said roof rail outer rear member.

6. A vehicle roof structure according to claim 5 further comprising a roof panel fixedly attached along a roof flange of said front header and a roof flange of said door opening panel.

7. A vehicle structure according to claim 6 wherein said roof panel and said door opening panel define a roof ditch which is offset toward said door opening from said roof rail outer rear member roof flange.

8. A vehicle roof structure according to claim 1 wherein said pillar support member, side roof rail, and said roof rail outer front member include opening formed therein for welding access.

9. A vehicle roof structure according to claim 2 wherein an end of said inner front header is offset towards said pillar support member with respect to an end of said outer front header.

10. A vehicle roof structure according to claim 4 wherein an end of said roof rail inner rear is offset towards said pillar support member with respect to an end of said roof rail outer rear.

11. A vehicle roof structure according to claim 9 wherein said end of said outer front header overlaps a recessed portion of said roof rail outer front member in said region of said first edge.

12. A vehicle roof structure according to claim 10 wherein said roof rail outer front member overlaps a recessed portion of said roof rail outer rear member in said region of said second edge.

13. A vehicle roof structure comprising:
   a front header comprising an inner front header and an outer front header joined together along a respective windshield flange and a respective roof flange, an end of said inner front header being offset with respect to an end of said outer front header, said front header having a substantially box-shaped cross-section;
   a side roof rail comprising a roof rail inner rear member and a roof rail outer rear member joined together along a respective door opening flange and a respective roof flange, an end of said roof rail inner rear member being offset with respect to an end of said roof rail outer rear member, said side roof rail having a substantially box-shaped cross-section;
   a pillar support member adjoining said end of said inner front header and said end of said roof rail inner rear member and having an elongated member extending between a windshield opening and a door opening; and a roof rail outer front member affixed to said pillar support member, said outer front header and said roof rail outer rear member, said roof rail outer front member extending along at least a portion of said elongated member, said roof rail outer front member and said pillar support member forming a substantially box-shaped cross-section extending between said ends of said inner and outer front headers and said ends of said roof rail inner and outer rear members and extending along said elongated member such that a continuous substantially box-shaped cross-section exists throughout a joint defined by said vehicle roof structure.

14. A vehicle roof structure according to claim 13 wherein said pillar support member is an A-pillar inner support having a substantially hat-shaped cross-section.

15. A vehicle roof structure according to claim 13 wherein said end of said outer front header overlaps a recessed portion of said roof rail outer front member.

16. A vehicle roof structure according to claim 15 wherein said roof rail outer front member overlaps a recessed portion at said end of said roof rail outer rear member.

17. A vehicle roof structure according to claim 13 further comprising a door opening panel fixedly attached along a respective door opening flange of said pillar support member, roof rail outer front member, and said roof rail outer rear member.

18. A vehicle roof structure according to claim 17 further comprising a roof panel fixedly attached along a roof flange of said front header and a roof flange of said door opening panel.

19. A vehicle structure according to claim 18 wherein said roof panel and said door opening panel define a roof ditch which is offset toward said door opening from said roof rail outer rear member roof flange.

* * * * *